Dec. 24, 1957
C. B. MITCHELL
2,817,393
SAFETY HARNESS
Filed July 29, 1954
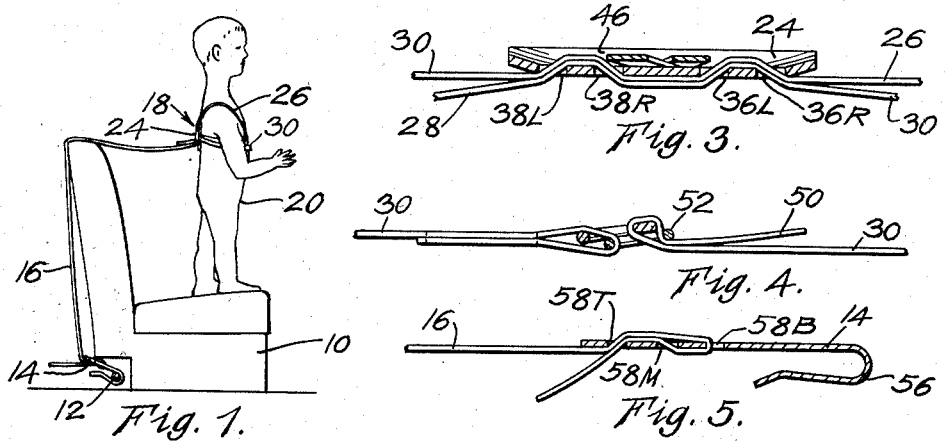
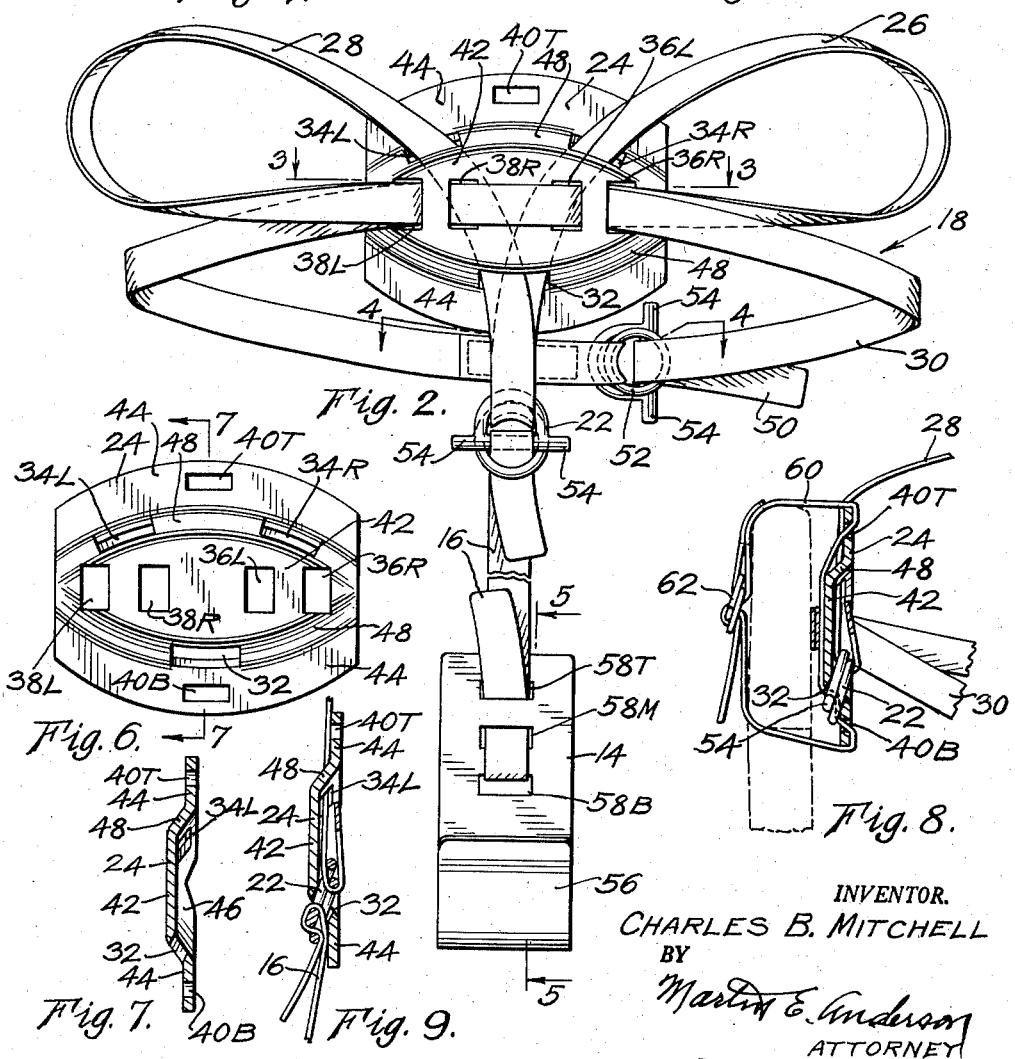
INVENTOR.
CHARLES B. MITCHELL
BY
Martin E. Anderson
ATTORNEY

United States Patent Office 2,817,393
Patented Dec. 24, 1957

2,817,393

SAFETY HARNESS

Charles B. Mitchell, Denver, Colo.

Application July 29, 1954, Serial No. 446,628

10 Claims. (Cl. 155—189)

This invention relates to safety harnesses and more particularly to safety harnesses for use in protecting small children from injury while riding in automobiles.

It is well known to parents that small children are generally exceedingly difficult to care for and protect from injury while riding in an automobile. Active children, and most small children are extremely active, dislike being confined in a car seat and much prefer to hang out the car window or climb back and forth over the front seat. It is difficult to hold their interest in any one thing for any length of time; and as a result, they are moving around the car almost continuously placing themselves in situations and positions which could easily result in serious injury. If the driver of the automobile alone is forced to care for the children the danger is greatly increased because the driver's attention must primarily be given to driving the vehicle if accidents are to be avoided. This situation resolves itself into one of two predicaments; either the car is driven safely and the children go unattended, or the children are taken care of and the automobile is driven in an unsafe manner. Neither situation is a healthy one.

The majority of injuries to children while riding in an automobile result either from a sudden stop in which the child is thrown against the dash panel or windshield or, injuries sustained when a child falls out of a window or a door. In any event the injuries are quite often serious and sometimes even fatal.

The principal object of the present invention is to provide a safety harness for use in automobiles by means of which a small child may be safeguarded against any of the aforementioned injuries.

The second object of the invention is the provision of a safety harness which is comfortable to wear, rapidly and easily fitted to the body of any child, and which will safely withstand a sudden stress many times greater than that resulting from an automobile accident without harm to the child.

A further object of the invention described herein is the provision of a saftey harness which will permit the child to move freely about the automobile yet, will restrain his movements to such an extent that he cannot get in a position likely to cause him injury.

Additional objects of the invention are the provision of: a harness which can readily be detached from the automobile and attached to a leash thus forming a convenient shopping harness; a harness which is equally suitable for use as an invalid's safety harness to support an invalid while sitting in a chair; a safety harness which is simple and inexpensive to manufacture and decorative in appearance; and, a safety harness which easily may be either permanently or removably attached to any of the common passenger automobiles.

Other objects will be in part apparent and in part pointed out specifically hereinafter in connection with the description of the drawing which follows; and in which, Figure 1 is a view showing the safety harness of the present invention secured in place to an automobile seat and fastened about the body of a child;

Figure 2 is a rear elevation showing the attaching means, the plate, and the strap arrangement interconnecting the attaching means and plate in a manner to form the harness;

Figure 3 is a section taken along line 3—3 of Figure 2;

Figure 4 is a section taken along line 4—4 of Figure 2 showing the manner in which the ends of the chest strap are fastened together;

Figure 5 is a section taken along line 5—5 of Figure 2 showing the attaching means and the manner in which the seat strap is attached thereto;

Figure 6 is a rear elevation of the plate;

Figure 7 is a section taken along line 7—7 of Figure 6;

Figure 8 is a vertical section taken through the center of the plate illustrating the manner in which the safety harness may be used for invalids; and, Figure 9 is a vertical section taken through the center of the plate illustrating the manner in which the O and D ring connector element fits into the plate during normal usage and connects the harness strap and the seat strap together.

Referring now in particular to Figure 1 of the drawing, reference numeral 10 indicates a conventional passenger automobile seat which has one or more transverse rods or other frame members 12 on which attaching member 14 may be removably fastened. A seat strap 16 is detachably connected to the attaching member, passed upward behind the seat and over the top; whereupon, it is detachably secured to the harness strap indicated in a general way by numeral 18 and which will be described in detail in connection with the remaining figures of the drawing. The harness strap 18 is shown in position about the chest and over the shoulders of a small child 20 standing on the seat of the automobile. The length of seat strap 16 is adjustable both at the point at which it is joined to the harness strap and the attaching member 14, as will be described hereinafter, in order that the seat strap may be adjusted to a length which will permit the child to move rather freely about the automobile and yet will restrain his movements to such an extent that he cannot come into contact with the dash panel or windshield upon a sudden stop or fall out of the window or door of the automobile.

In connection with Figure 2 of the drawing it will be seen that the safety harness of the present invention comprises in general two straps, a harness strap 18 and a seat strap 16 removably attached to one another by means of a slightly modified O and D ring connector element 22. The seat strap is also connected to attaching member 14 in a manner that will be described in connection with Figure 5 hereof. The harness strap is threaded through openings in a plate 24 to form shoulder loops 26 and 28, and chest loop 30.

In Figures 6 and 7, it will be seen that plate 24 is provided with the following openings. A connector element opening 32 preferably positioned near the vertical center line of the plate below its center. Shoulder loop openings 34R and 34L positioned above the connector element opening and the center of the plate spaced on opposite sides of the vertical center line thereof. Four chest loop openings 36R, 36L, 38R and 38L placed in a line between the shoulder loop openings and the connector element opening preferably near the horizontal center line of the plate. And, two plate support openings 40B and 40T near the top and bottom of the plate preferably on the vertical center line thereof. In the preferred plate construction the central portion of the plate 42 is recessed slightly behind the edge portions 44 in order to form a cavity 46 which will permit free movement of the harness strap between the plate and the child's body. The inclined wall portion 48 of the plate joining together the central portion and edge portions thereof preferably contains the connector element and the shoulder loop openings so that the harness strap may be passed through these openings without binding.

Referring again to Figure 2, the manner in which harness strap 18 is threaded through the openings in plate 24 will now be described. One end 50 of the harness strap is passed behind plate 24 in through chest loop opening 38L into cavity 46, out through chest loop opening 38R, in through chest loop opening 36L, out through chest loop opening 36R, thence around to form right shoulder loop 26; whereupon, it is passed in through shoulder loop opening 34R, out through connector element opening 32 and through the O and D rings of connector element 22. The harness strap is then passed back into cavity 46 through connector element opening 32, out through the other shoulder loop opening 34L to form left shoulder loop 28, thence in through chest loop opening 38L, out through chest loop opening 38R, in through chest loop opening 36L and finally out through chest loop opening 36R; whereupon, said end 50 may be joined to the opposite end of the harness strap having O and D ring connector element 52 to form chest loop 30. In order to fasten the harness strap to the child, the plate is placed in the center of the back, the right arm is passed through right shoulder loop opening 26, the left arm through left shoulder loop opening 28, and the chest loop is fastened around the body in the manner shown most clearly in Figure 1.

In connection with Figures 2 and 9, it will be seen that O and D ring connector elements 22 and 52 have been modified to provide extensions 54 for the straight portion of the D element extending on each side thereof. Connector element opening 32 of the plate is sized to receive the closed portions of the O and D rings but not extensions 54. Therefore, connector element 22 cannot pass through opening 32 but will be retained in the position shown in Figure 9 by extensions 54 bearing against the outside of inclined wall portion 48. The portion of the connector element containing the harness strap, however, lies within cavity 46 of the plate and permits free slidable movement of the harness strap to automatically equalize the lengths of shoulder loops 26 and 28. For example, with connector element 22 in the position shown in Figure 9, a force tending to make loop 26 in Figure 1 larger will immediately result in a corresponding decrease in the size of loop 28. Thus, if one loop is larger than the other when placed over the child's shoulders a very slight movement will adjust loops 26 and 28 to substantially the same size.

In Figures 2 and 3 it will be seen that the shoulder strap passes twice through chest loop openings 36 and 38. The size of shoulder loops 26 and 28 may be rapidly and easily adjusted to a comfortable snug fit on the child's body by holding the plate and pulling on the portion of the harness strap forming chest loop 30 and terminating in end 50 to decrease the size of left shoulder loop 28; and, by pulling on the portion of the harness strap forming chest loop 30 and terminating in connector element 52 to lessen the size of shoulder loop 26. If, however, a force is applied to shoulder loops 26 and 28 simultaneously the size of the loops will not change nor will the harness strap slip through the chest loop openings because the force exerted causes adjacent portions of the harness strap to bear so tightly against one another and the edges of the chest loop openings, shown most clearly in Figure 3, that the straps will not slip even under the influence of very great forces. Any stress or force resulting from stopping an automobile rapidly, a collision, or other circumstance, will act in the above manner to place an equal stress on each of the shoulder loops simultaneously so that they will not slip. Forces applied to end 50 of the harness strap and connector element end 52 of the harness strap will act in exactly the same manner to prevent the strap from slipping within the chest loop openings. For this reason, it is unnecessary to fasten the chest loop around the child's body and these ends may be left free without danger of the straps coming out of the chest loop openings when a force is applied to the shoulder loops. However, the preferred method of using the safety harness is to fasten the chest loop about the child's body in the manner shown in Figure 2 as a supplemental safety measure and also to prevent the child from removing the harness. An impact which tends to throw the child forward will pull connector element 22 out of connector element opening 32 in the plate resulting in a further tightening of shoulder loops 26 and 28 about the shoulders of the child. These shoulder loops are adjusted to the child with connector element 22 positioned within connector element opening 32 in the plate. Any slack in the harness strap after adjustment is taken up in chest loop 30. The extensions 54 on connector element 22 and 52 provide a rapid means for disconnecting the harness strap from the seat strap as it is necessary only to grasp the extensions with the thumb and forefinger, lift the D ring and pull the seat strap free. This detachable connection is quite useful in that the harness strap may be left in place on the body of the child and a leash attached in place of the seat strap to keep the child away from harm while shopping and during other activities.

With reference now in particular to Figure 4, the manner in which the harness strap is attached to connector element 52 is shown. A loop is formed in the end of the harness strap, passing through both the O and D rings of the connector element and the loop is sewn together as shown. In order to attach free end 50 to the harness strap to the connector element, the free end is passed through the openings in both the O and D rings, around the straight portion of the D ring thence back through the O ring. Seat strap 16 is fastened to connector element 22 in a like manner.

Considering now Figures 2 and 5 wherein is shown the manner of attaching seat strap 16 to attaching member 14, the attaching member will be seen to comprise a flat piece of metal bent in the form of a hook 56 at one end. The attaching member is provided with three openings 58T, 58M and 58B. One end of the seat strap is passed into opening 58T across opening 58M and out through opening 58B thence in through 58M and out through opening 58T. With the hook of the attaching element firmly fixed in place a force applied to seat strap 16 away from the attaching member will force one portion of the strap against the adjacent portion on the attaching member and the frictional contact between the adjacent portions of the strap and the edges of the openings within the attaching member will prevent the strap from slipping. It is to be understood that although the attaching member that has been illustrated is simple and convenient to use, simple to manufacture and strong enough to withstand any force likely to be encountered, that many other methods of removably or permanently attaching the seat strap within the automobile may be used.

Figure 8 illustrates another manner in which the safety harness of the present invention can be used especially for invalids who have lost the use of their legs and must be supported in a sitting position. Seat strap 16 is not used however, the plate and harness strap remain the same and are fitted to the body of the invalid in the manner above described. A supporting strap 60 is merely threaded through plate support openings 40B and 40T across the back of the plate and fastened around the back of a chair by a suitable connector element 62. Thus, the trunk of the body is supported in the chair without the use of the limbs.

Having thus described the many useful and novel features of the present invention in connection with the accompanying drawing it will be seen that the many ob- jects for which it was designed have been achieved and therefore; I claim:

1. A safety harness comprising a plate, said plate having left and right shoulder loop openings positioned respectively in the upper left and upper right portions thereof and at least one left and one right chest loop opening positioned respectively in the lower left and lower right portions; a harness strap threaded successively through the left chest loop opening, the right chest loop opening, the right shoulder loop opening, the left shoulder loop opening, and again in the same direction through the left chest loop opening and the right chest loop opening, the ends of the harness strap being detachably connected together to form a chest loop; a right shoulder loop formed by the portion of the harness strap extending between the right chest loop opening and the right shoulder loop opening; a left shoulder loop formed by the portion of the harness strap extending between the left chest loop opening and the left shoulder loop opening; and a restraining strap having one end thereof operatively connected to the harness strap between the shoulder loop openings.

2. A safety harness comprising a plate to be positioned on a person's back, said plate having left and right shoulder loop openings positioned respectively in the upper left and right portions thereof and at least one left and one right chest loop opening positioned respectively in the lower left and lower right portions thereof, a harness strap threaded successively in through the left chest loop opening, passing between the plate and the person's back, out through the right chest loop opening, through the right shoulder loop opening, through the left shoulder loop opening, and again in through the left chest loop opening and out through the right chest loop opening, the portions of the harness strap extending between the left and right chest loop openings overlying one another; a right shoulder loop formed by the portion of the harness strap lying between the right shoulder loop opening and the right chest loop opening to be positioned on the right shoulder of a person; a left shoulder loop formed by the portion of the harness strap lying between the left shoulder loop opening and the left chest loop opening to be positioned on the left shoulder of a person; and a restraining strap having one end operatively connected to the harness strap between the shoulder loop openings.

3. A device in accordance with claim 2 in which a first intermediate chest loop opening is provided in the plate between the left and right chest loop openings adjacent the left chest loop opening, a second intermediate chest loop opening is provided in the plate between the left and right chest loop openings adjacent the right chest loop opening, all of said chest loop openings lying substantially in a straight line below the shoulder loop openings, and the harness strap being threaded from the left chest loop opening out through the first intermediate chest loop opening, into the second intermediate chest loop opening from the first intermediate chest loop opening, and then out through the right chest loop opening.

4. A device in accordance with claim 2 in which the ends of the harness strap are detachably connected together to form a chest loop to be positioned around the chest of a person.

5. A device in accordance with claim 2 in which the plate is provided with a connector element opening positioned below and between the chest loop openings, a connector element is attached to the harness strap at a point between the chest loop openings, and the restraining strap is detachably connected to the connector element through the connector element opening.

6. A device in accordance with claim 2 in which the plate is provided with two plate support openings, a plate support strap is threaded through the plate support openings and attached to a fixed support.

7. A device in accordance with claim 2 in which the plate is provided with a cavity opening against the person's back formed by a central recessed wall portion and inclined wall portions adjoining the central recessed wall portion, the central wall portion containing the chest loop openings and the inclined wall portion containing a connector element opening and the left and right shoulder loop openings positioned above and on each side of said connector element opening; and in which the restraining strap detachably connected through the connector element opening to the portion of the harness strap extending between the left and right shoulder loop openings.

8. A safety harness comprising a plate to be positioned upon a person's back, said plate having left and right shoulder loop openings positioned respectively in the upper left and the upper right portions, a connector element opening positioned below and between said shoulder loop openings, and at least a left and a right chest loop opening positioned between the shoulder loop openings and the connector element opening; a harness strap threaded successively in through the left chest loop opening between the plate and the person's back, out through the right chest loop opening, in through the right shoulder loop opening, out through the left shoulder loop opening, in again through the left chest loop opening, and finally out again through the right chest loop opening, the two portions of the harness strap extending between the left and right chest loop openings overlying one another; a right shoulder loop formed in the harness strap between the right chest loop opening and the right shoulder loop opening to be positioned on the right shoulder of a person; a left shoulder loop formed in the harness strap between the left chest loop opening and the left shoulder loop opening to be positioned on the left shoulder of a person; a connector element fastened to the portion of the harness strap passing between the left and right shoulder loop openings; and a restraining strap removably attached to the connector element through the connector element opening.

9. A safety harness comprising a plate to be positioned upon a person's back, said plate having a cavity formed by a central recessed portion and inclined wall portions adjoining said central portion; the inclined wall portions being provided with left and right shoulder loop openings and a connector element opening positioned below and between said shoulder loop openings; the central recessed portion having left and right chest loop openings, a first intermediate chest loop opening adjacent the left chest loop opening, and a second intermediate chest loop opening between the first intermediate chest loop opening and the right chest loop opening, said chest loop openings lying in substantially a straight line between the shoulder loop openings and the connector element opening; a harness strap threaded successively through the left chest loop opening into the cavity, out through the first intermediate chest loop opening, in through the second intermediate chest loop opening, out through the right chest loop opening, in through the right shoulder loop opening, out through the left shoulder loop opening, again in through the left chest loop opening, again out through the first intermediate chest loop opening, again in through the second intermediate chest loop opening, and finally out again through the right chest loop opening, the two portions of said harness strap threaded between the left and right chest loop openings overlying one another; a right shoulder loop formed in the harness strap between the right chest loop opening and the right shoulder loop opening to be positioned on the right shoulder of a person; a left shoulder loop formed in the harness strap between the left chest loop opening and the left shoulder loop opening to be positioned on the left shoulder of a person; an O and D ring connector element attached to one end of the harness strap; a chest loop formed in the harness strap by attaching the ends of said harness strap together, said chest loop to be positioned about the chest of a person; a bight formed in the portion of the harness strap extending between the left and right shoulder loop openings; an O and D ring connector element attached to the bight through the connector element opening; means comprising extensions on the D ring of the connector element to prevent said connector element from passing through the connector element opening; an attaching member adapted to be secured within an automobile; and a restraining strap attached between the attaching member and the O and D ring connector element within the connector element opening.

10. A safety harness comprising a plate to be positioned upon a person's back, said plate having a cavity formed by a central recessed portion and inclined wall portions adjoining said central portion; the inclined wall portions being provided with left and right shoulder loop openings and a connector element opening positioned below and between said shoulder loop openings; the central recessed portion having left and right chest loop openings, a first intermediate chest loop opening adjacent the left chest loop opening, and a second intermediate chest loop opening between the first intermediate chest loop opening and the right chest loop opening, said chest loop openings lying substantially in a straight line between the shoulder loop openings and the connector element opening; a harness strap threaded successively through the left chest loop opening into the cavity, out through the first intermediate chest loop opening, in through the second intermediate chest loop opening, out through the right chest loop opening, in through the right shoulder loop opening, out through the left shoulder loop opening, again in through the left chest loop opening, again out through the first intermediate chest loop opening, again in through the second intermediate chest loop opening, and finally out again through the right chest loop opening, the two portions of said harness strap threaded between the left and right chest loop openings overlying one another; a right shoulder loop formed in the harness strap between the right chest loop opening and the right shoulder loop opening to be positioned on the right shoulder of a person; a left shoulder loop formed in the harness strap between the left chest loop opening and the left shoulder loop opening to be positioned on the left shoulder of a person; a bight formed in the portion of the harness strap extending between the left and right shoulder loop openings; a connector element attached to the bight through the connector element opening; said connector element opening being sized to permit only a portion of the connector element to enter the cavity; and a restraining strap removably attached to the connector element.

References Cited in the file of this patent

UNITED STATES PATENTS

| | | |
|---|---|---|
| 1,697,363 | Losey | Jan. 1, 1929 |
| 2,758,769 | Nunn et al. | Aug. 14, 1956 |